United States Patent [19] [11] 3,922,571
Smith [45] Nov. 25, 1975

[54] SEMICONDUCTOR VOLTAGE TRANSFORMER

[75] Inventor: George Elwood Smith, Murray Hill, N.J.

[73] Assignee: Bell Telephone Laboratories, Incorporated, Murray Hill, N.J.

[22] Filed: June 12, 1974

[21] Appl. No.: 478,606

[52] U.S. Cl. .................. 307/296; 307/304; 321/15; 357/23; 357/24; 357/41
[51] Int. Cl.² ...................... H01L 29/94; H02M 7/10
[58] Field of Search .......... 357/23, 24, 41; 307/297, 307/304, 296

[56] References Cited

UNITED STATES PATENTS

| | | | |
|---|---|---|---|
| 3,792,322 | 2/1974 | Boyle et al. | 357/24 |
| 3,794,862 | 2/1974 | Jenne | 357/24 |
| 3,806,741 | 4/1974 | Smith | 307/304 |
| 3,808,468 | 4/1974 | Ludlow et al. | 307/304 |
| 3,816,769 | 6/1974 | Crowle | 307/304 |
| 3,845,331 | 10/1974 | Luscher | 357/24 |

OTHER PUBLICATIONS

Frantz et al., "MOSFET SUBSTRATE BIAS VOLTAGE GENERATOR," IBM Tech. Discl. Bull., Vol. 11, No. 10, March 1969, page 1219.

*Primary Examiner*—William D. Larkins
*Attorney, Agent, or Firm*—L. H. Birnbaum

[57] ABSTRACT

A semiconductor device for increasing voltage levels is disclosed. The device comprises an MIS structure formed over a p-n junction. Suitable biasing of the metal electrode depletes the semiconductor surface of majority carriers and causes the accumulation of minority carriers from the bulk. At the same time a bending of the energy bands in the n and p regions is effected forming a potential barrier. When the electrode is switched to a reference potential, the minority carriers are raised to a higher potential and are prevented from returning to the bulk of the semiconductor by the potential barrier. An electrical path is provided for removing the minority carriers from the surface and combining the signal with the applied electrode potential.

9 Claims, 5 Drawing Figures

SEMICONDUCTOR VOLTAGE TRANSFORMER

BACKGROUND OF THE INVENTION

This invention relates to a device for effecting voltage transformations.

In many systems, it is desirable to provide high voltage levels when only low voltages are available. This is particularly true, for example, in telephone handsets where the voltage supplied by the external power source can be as low as 3 volts and higher levels are needed to operate auxiliary systems such as repertory dialer and IGFET logic systems built into the equipment. This requirement has created the need for compact and inexpensive voltage transformers. Most prior art devices, such as the well-known coil transformers, are too bulky and expensive to be commercially feasible for such an application. It is therefore desirable to provide a compact and inexpensive device for raising voltage levels which is compatible with systems produced on a large scale and which does not sacrifice too much efficiency in operation.

SUMMARY OF THE INVENTION

In accordance with the invention, an all solid state voltage transformer is provided. The device basically comprises an MIS (Metal-Insulator-Semiconductor) device formed over a p-n junction. The doping of the semiconductor region adjacent the metal electrode is chosen so that when a forward bias is supplied to the metal electrode, the entire region is depleted of majority carriers and minority carriers collect at the surface. At the same time, a bending of the energy bands in the semiconductor creates a potential barrier. When the potential is then switched to a less forward biased condition, the minority carriers are prevented from returning to the bulk. These carriers are removed from the surface by a rectifying contact and cooperate with the potential applied to the electrode to achieve an output voltage greater than the input voltage. Utilizing several of these devices, a cascading of the voltage levels may be realized.

BRIEF DESCRIPTION OF THE DRAWING

These and other features of the invention will be delineated in detail in the description to follow. In the drawing.

DETAILED DESCRIPTION OF THE INVENTION

Figure 1:
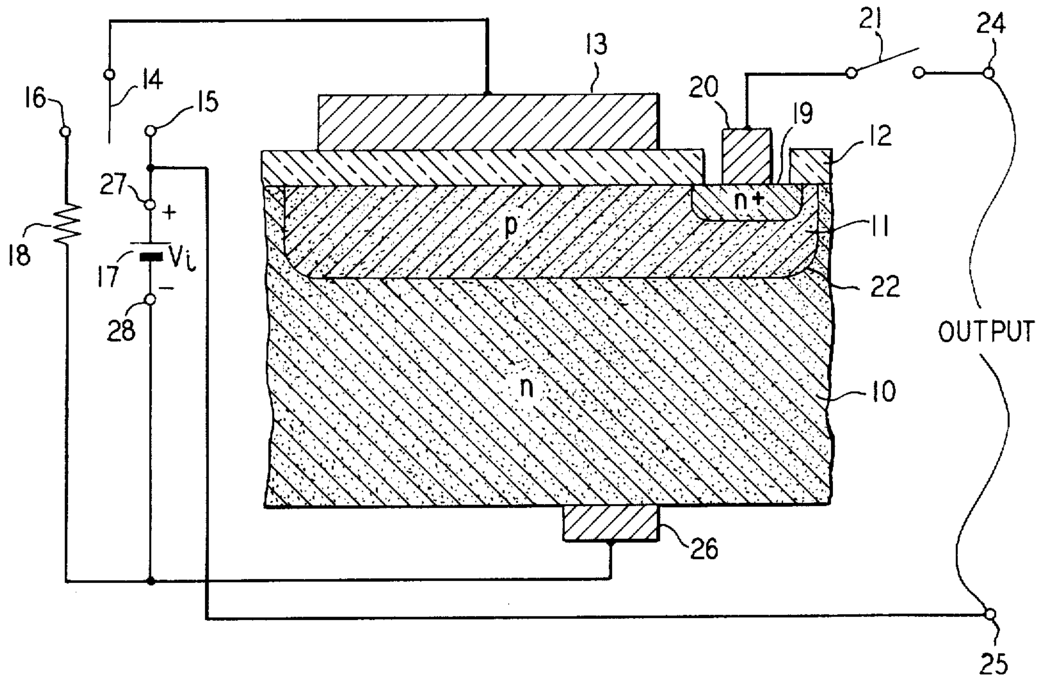
FIG. 1 is a cross-sectional view, partly schematic, of a device in accordance with one embodiment of the invention.
Figure 2A:
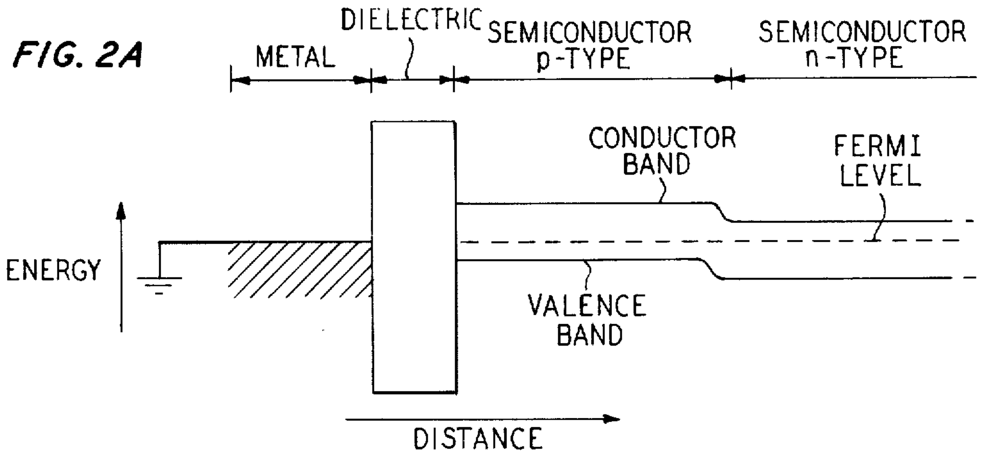
FIGS. 2A–2C are energy band diagrams depicting energies which occur in the device of FIG. 1 during a basic mode of operation in accordance with the same embodiment.
Figure 2B:
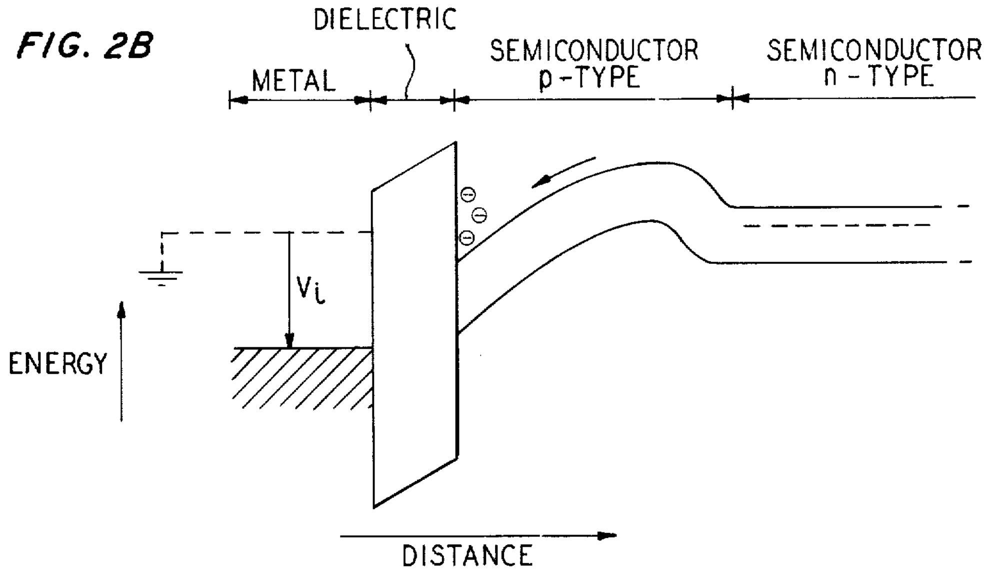
Figure 2C:
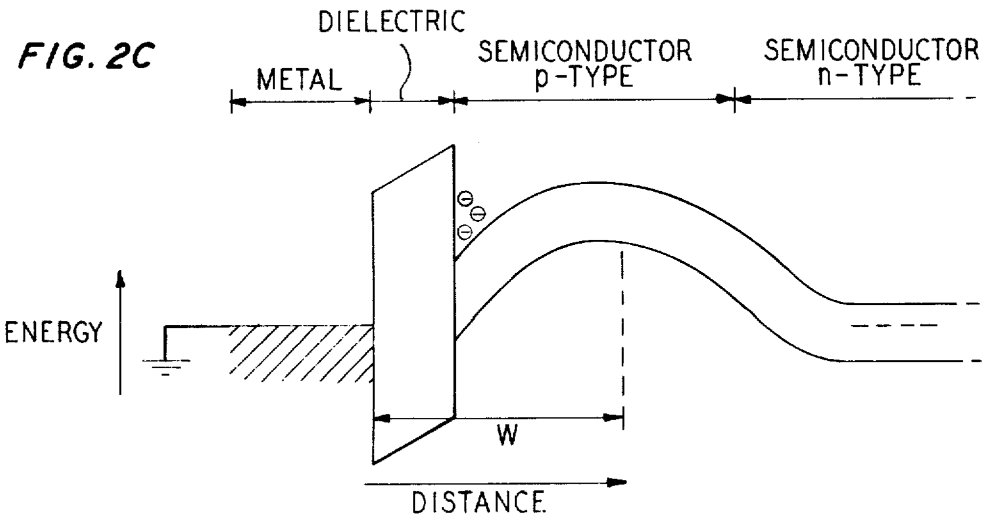

The principles of the invention are described in relation to the embodiment shown in FIG. 1 and the energy diagrams of FIGS. 2A–2C. Referring to FIG. 1, the device comprises first a semiconductor bulk material such as silicon of n-type conductivity, 10, in which is surface region, 11, of p-type material to form the p-n junction illustrated as line 22. The formation of the p-n junction may be accomplished by any of the methods well-known in the art, such as diffusion, liquid or vapor phase epitaxy, or ion implantation. The junction should preferably be formed to intersect the surface of the semiconductor as shown rather than to intersect the edges as would be the case when a p-type layer is grown over the entire surface of the n-type bulk. This is so the junction can be passivated by a dielectric layer, 12, such as $SiO_2$, which is formed over the surface of the semiconductor. Of course, it will be realized that the principles of the invention are equally applicable to a p-type bulk with a region of n-type material at the surface, in which case all polarities shown and to be described would be reversed. The doping concentration of the p-type surface region is an important criterion in this invention and will be described in more detail later.

A metal electrode, 13, is formed on the dielectric layer, 12, preferably covering a major portion of the p-type surface region. This electrode is coupled alternatively by some means, illustrated schematically as switch 14 operating between terminals 15 and 16, to either a source of d.c. potential shown as battery 17 or to the substrate potential through a resistor 18 by means of ohmic contact 26. The source of potential, 17, is of a polarity which will supply to electrode 13 a forward bias with respect to the p-n junction 22. A rectifying contact is also formed within the p-type surface region by a region of $n^+$ conductivity type 19 and ohmic contact is made to this latter region through a hole in the dielectric by metal electrode 20. This rectifying contact, along with battery 17, is coupled across terminals 24 and 25, where the increased potential can be observed, by means of switch 21.

The operation of the device will now be described with further reference to the energy band diagrams of FIGS. 2A–2C which illustrate the energies along a longitudinal cross-section of the device. FIG. 2A shows the energy band levels during the time when switch 14 couples electrode 13 to the substrate potential (which may be considered a reference potential and switch 21 is open. For the condition depicted in FIG. 2B, switch 14 couples the potential $V_i$ to electrode 13. The doping density of the p-type surface region is chosen so that the potential $V_i$ completely depletes the p region of majority carriers (holes). This causes minority carriers from the bulk, represented by $\theta$ in the figure, to collect at the surface of the p-type region. The amount of such collected charge, Q, is found to be $$Q = C_o (V_i - V_T) \tag{1}$$

where $C_o$ is the dielectric capacitance and $V_T$ is the threshold voltage (in this case, the voltage needed to make the energy of the conduction band equal to the Fermi level). The potential applied to electrode 13 also causes a bending of the energy bands as shown to create a potential barrier in the p-type region. The potential on electrode 13 is then returned to the reference potential by returning switch 14 to terminal 16. This, of course, will raise the potential at the dielectric semiconductor interface as shown in FIG. 2C. The electrons collected at the interface which would have a tendency to flow out of the p-type region into the bulk are prevented from doing so by the potential barrier. The minority carriers are now at a high electron potential, as in the $n^+$ contact 19, which has been left floating. By closing switch 21, this potential appears across terminals 24 and 25 along with the potential $V_i$ from battery 17. The net result of this operation is that an increased potential appears across terminals 24 and 25 which is the sum of the potential $V_i$ and the potential of the collected minority carriers with respect to the substrate.

As stated previously, it is important that the doping concentration of the p-type surface region be chosen so that the region is completely depleted upon the application of the input voltage $V_i$ to electrode 13. The necessary doping concentration for a particular $V_i$ can be calculated according to techniques well-known in MOS technology. It is also important to avoid breakdown at the surface during operation. Specifically, it has been calculated that in order to completely deplete the region and avoid breakdown, the maximum doping density of the surface region $N_A$ in $cm^{-3}$, is given by:

$$N_A \leq \left( \frac{6.6 \times 10^{19} (E_g/1.1)^{3/2} K_S}{W^2} \right)^{4/7} \quad (2)$$

where $E_g$ is the band gap energy of the semiconductor in $eV$, $K_S$ is the dielectric constant of the insulator and W is the distance from the top surface of the insulator to the peak energy in the surface region (see FIG. 2C). For silicon, the doping density of the surface region will advantageously be less than approximately $10^{17}$ $cm^{-3}$. This relationship assumes a uniform doping of the surface region. It will be appreciated by those skilled in the art that nonuniform doping may be used if desired. It will be noted that the requirements of doping of the surface region in accordance with the invention are similar to those of the surface region in a buried channel charge coupled device (see, for example, U.S. pat. application of W. S. Boyle and G. E. Smith, Ser. No. 352,513, filed Apr. 19, 1973, now U.S. Pat. No. 3,792,322).

Enhanced potential may be further achieved in accordance with the invention by electrically coupling together several devices of the type illustrated in FIG. 1 to form a cascading system.

Figure 3:
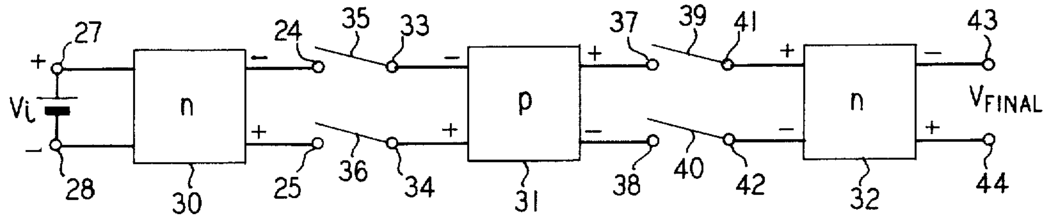
FIG. 3 is a schematic illustration of a cascading system in accordance with a further embodiment of the invention.

One such system is illustrated schematically in FIG. 3. The system comprises 3 devices such as shown in FIG. 1 illustrated as blocks 30, 31 and 32 with designations of n or p indicating the conductivity type of the substrate. Thus, block 30 represents the device of FIG. 1 with input and output terminals being similarly numbered and with $V_i$ being applied across the input as before. During the portion of the operation wherein the minority carriers are at the enhanced potential in the device, 30, suitable switching means such as 35 and 36 couple the enhanced output potential of device 30 across input terminals 33 and 34 of device 31. The latter device is essentially the FIG. 1 device with all polarities reversed so that the negative potential applied across terminals 33 and 34 forward biases the p-n junction to collect holes when operated in the manner previously described. Similarly, during the time the holes are at the enhanced potential in device 31, switching means 39 and 40 couple output terminals 37 and 38 of device 31 to input terminals 41 and 42 of device 32. Device 32 operates in the same manner as device 30 to produce electrons at the surface and further enhance the input potential. It will be realized, therefore, that $V_{final}$ which appears across output terminals 43 and 44 is given by:

$$|V_{final}| = |V_i| + |V_{01}| + |V_{02}| + |V_{03}|$$

where $V_{01}$, $V_{02}$ and $V_{03}$ are the potential increases resulting from devices 30, 31 and 32, respectively. It will be appreciated, of course, that many more devices may be coupled together in this fashion to achieve even greater potential increases. It will be further realized that such a system can be formed as an integrated circuit on a single semiconductor chip.

Various modifications and extensions of the invention will become apparent to those skilled in the art. For example, the rectifying contact need not take the form described but could be any means known for drawing out minority carriers from the surface region such as a Schottky contact. This and other variations which basically rely on the teachings through which the invention has advanced the art are properly considered within the spirit and scope of the invention.

What is claimed is:

1. A device for increasing electrical potential comprising:

a first zone of semiconductor material of one conductivity type;

a second zone of semiconductor material of opposite conductivity type overlying at least a portion of said first zone so as to form a p-n junction therebetween;

an insulating layer covering at least a portion of the major surface defined by said first and second zones;

a metal electrode disposed on said insulating layer overlying a portion of the area over said second zone;

conduction means for applying a forward bias to said metal electrode with respect to said p-n junction; and an output circuit including contact means formed at the major surface within said second zone for removing minority carriers collected at the surface of said second zone resulting from said forward-biased condition and circuit means for adding the potential of said collected minority carriers and said applied potential, said contact means making rectifying contact to said second zone.

2. The device according to claim 1 further comprising means for switching said electrode between said forward biased potential and a reference potential.

3. The device according to claim 1 further comprising means for electrically decoupling said output circuit from said second zone.

4. The device according to claim 1 wherein the means for removing minority carriers comprises a region of material of said one conductivity type formed in said second zone of material of said opposite conductivity type.

5. The device according to claim 1 wherein the means for removing minority carriers comprises a Schottky barrier diode formed at the surface of said second zone of opposite conductivity type.

6. A device for increasing electrical potential comprising:

a first zone of semiconductor material of one conductivity type;

a second zone of semiconductor material of opposite conductivity type contiguous to said first zone so as to form a p-n junction therebetween which extends to the major semiconductor surface defined by said first and second zones;

an insulating layer covering at least a portion of the major surface defined by said first and second zones including the areas wherein the p-n junction extends to the surface;

a metal electrode disposed on said insulating layer overlying a substantial portion of the area over said second zone;

conduction means for applying a forward bias to said metal electrode with respect to said p-n junction;

means for switching said electrode between said forward-biased potential and a reference potential which provides a potential to said electrode which is less forward-biased with respect to said p-n junction;

an output circuit including contact means formed at the major surface within said second zone for removing minority carriers collected at the surface of said second zone resulting from said forward-biased condition and circuit means for adding the potential due to said collected minority carriers and said applied potential; said contact means making rectifying contact to said second zone; and means for electrically decoupling said output circuit from said second zone.

7. The device according to claim 6 wherein the means for removing minority carriers comprises a region of material of said one conductivity type formed in said second zone.

8. The device according to claim 6 wherein the means for removing minority carriers comprises a Schottky barrier diode formed at the surface of said second zone.

9. The device according to claim 6 further comprising means for forward-biasing said metal electrode with respect to said p-n junction of sufficient magnitude to completely deplete said second zone of majority carriers.

* * * * *